D. H. CHAMBERLAIN.
Carbureter.
No. 12,498.           Patented Mar. 6, 1855.
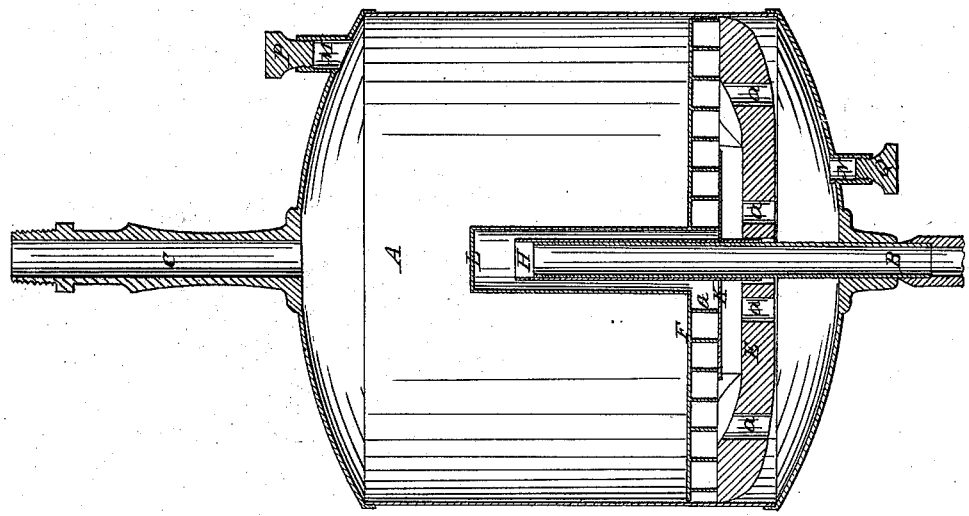
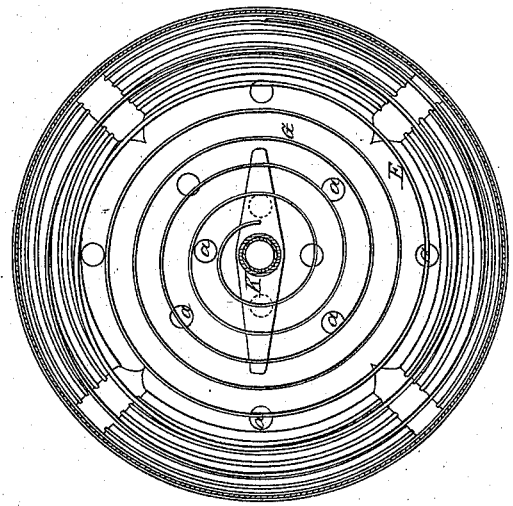
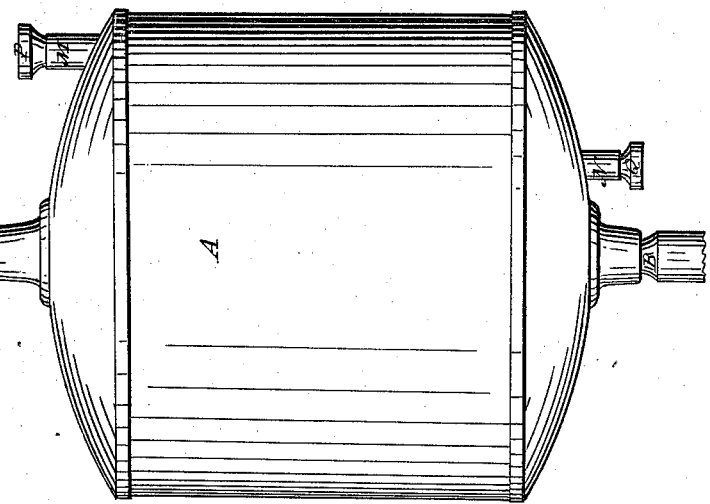

UNITED STATES PATENT OFFICE.

DEXTER H. CHAMBERLAIN, OF WEST ROXBURY, MASSACHUSETTS, ASSIGNOR TO HENRY WOODWARD.

APPARATUS FOR PURIFYING ILLUMINATING-GAS.

Specification of Letters Patent No. 12,498, dated March 6, 1855.

*To all whom it may concern:*

Be it known that I, DEXTER H. CHAMBERLAIN, of West Roxbury, in the county of Norfolk and State of Massachusetts, have invented a new and useful Apparatus or Method of Purifying Gas Previous to Its Being Burned; and I do hereby declare that the same is fully described and represented in the following specification and the accompanying drawings, letters, figures, and references thereof.

Of the said drawings Figure 1, represents an external view or elevation of my said apparatus. Fig. 2, is a vertical and central section of it. Fig. 3, is a horizontal section taken through the float or agitator.

In the said drawings, A, denotes a closed cylindrical vessel or cistern having an inlet pipe B, inserted in the central part of its bottom and made to extend some distance above the same in the body of the vessel as seen in Fig. 2. Said vessel is also provided with an outlet pipe C, extending out of its top. Within the vessel is placed a disk or float of wood or other suitable material as seen at E, said float being made to rotate freely around the inlet tube. Over this float is disposed a disk F, which is supported on the float by means of a spiral scroll, G, that extends downward from its under side and starts from a tube, H, which incloses the inlet pipe and is fastened to a cross piece or bar, K, which is secured or soldered to the scroll. The said tube, H, is surrounded by another tube L, that rises above it and opens into the scroll at its bottom, and is closed at its top.

It is intended that the float shall form a part of the agitator and serve to give to it a sufficient buoyant power to enable it to rotate in a liquid that may be placed in the vessel, A. Such vessel is provided with filling and discharging orifices or tubes as seen at M, and N, which when the apparatus is in use are to be closed by suitable screw caps or stoppers as seen at P, Q.

When naphtha or other suitable purifying liquid is placed within the vessel, A, so as to surround the agitator, and gas is suffered to pass into the vessel through the inlet pipe, it will flow into the agitator and through the scroll thereof, and by its discharge and action on the scroll it will put the agitator in revolution and keep it revolving in the liquid so as to continually stir up or agitate the same and enable it to operate to advantage in the purification of the gas.

In passing through the spiral channel formed by the spiral scroll, the gas is caused to circulate many times in contact with the liquid, and so as to enable such liquid to thoroughly act upon and purify the gas.

The bottom of the agitator may be provided with holes, a, a, for the free admission of the liquid into interior of the scroll.

I do not claim a gas purifying apparatus composed of a closed cistern [provided with ingress and egress pipes] and an annular float having an inverted concentric groove or chamber, and numerous passages leading therefrom, whereby the gas, suffered to flow into said chamber, while the float is resting on a purifying fluid, is caused to raise the float so as to escape from its chamber and pass over the surface of the liquid in numerous streams, the float having no rotary movement, whereby it is caused to stir and agitate the cleansing liquid, but What I do claim as my invention is—

An improved gas purifying apparatus arranged within the closed cistern and made to distribute gas in contact with the liquid therein, and to be put in rotation by the gas so as to stir up and agitate the said liquid as specified, the said apparatus consisting of a wooden or other proper float, E, and a separate gas receiving and discharging apparatus composed of the disk, F, the tube, L, and its receiving and discharging scroll or the equivalent therefor such a mode of constructing the agitator having important advantages over a simple float having an annular chamber formed within it and made while resting in a purifying liquid to receive gas and to be raised by it, and so as to permit it to escape in numerous thin streams and over and in contact with the liquid.

In testimony whereof I have hereunto set my signature this twenty first day of September A. D. 1854.

DEXTER H. CHAMBERLAIN.

Witnesses:
R. H. EARLY,
F. P. HALE, Jr.